United States Patent [19]

Kobayashi

[11] Patent Number: 5,017,082
[45] Date of Patent: May 21, 1991

[54] HANDLING APPARATUS

[75] Inventor: Isao Kobayashi, Kofu, Japan

[73] Assignee: Tokyo Electron Limited, Tokyo, Japan

[21] Appl. No.: 560,287

[22] Filed: Jul. 30, 1990

Related U.S. Application Data

[63] Continuation of Ser. No. 320,223, Mar. 7, 1989, abandoned.

[30] Foreign Application Priority Data

Mar. 7, 1988 [JP] Japan .................................. 63-51595

[51] Int. Cl.$^5$ .............................................. B25J 9/16
[52] U.S. Cl. ................................ 414/729; 318/568.16; 901/35; 901/47; 901/49
[58] Field of Search ..................... 414/730, 729; 901/9, 901/47, 49, 35; 180/169; 250/230, 561; 318/568.1, 568.16

[56] References Cited

U.S. PATENT DOCUMENTS

| | | | |
|---|---|---|---|
| 3,007,097 | 10/1961 | Shelley et al. | 901/47 X |
| 4,024,944 | 5/1977 | Adams et al. | 198/394 |
| 4,609,856 | 9/1986 | Hirose et al. | 250/561 |
| 4,667,082 | 5/1987 | Shibata et al. | 901/42 X |
| 4,766,322 | 8/1988 | Hashimoto | 250/561 |
| 4,831,316 | 5/1989 | Ishiguro et al. | 901/47 X |

Primary Examiner—Robert J. Spar
Assistant Examiner—Donald W. Underwood
Attorney, Agent, or Firm—Oblon, Spivak, McClelland, Maier & Neustadt

[57] ABSTRACT

A handling apparatus comprises a holding member for holding an object to be handled, a driving member for driving the holding member, a locus detection section provided in a fixed position which is not driven by the driving member, the locus detection section representing a locus along which the holding member is to move, and a sensor, provided on said holding member, for detecting the locus. The locus of the holding member is constantly detected by the sensor during the operation of the holding member, and, when the holding member is displaced from a predetermined locus, the operation of the handling apparatus is suddenly stopped. Then, the holding member is moved to a position where the locus detection section can be detected by the sensor, and the holding member is restored to an initial position.

6 Claims, 6 Drawing Sheets

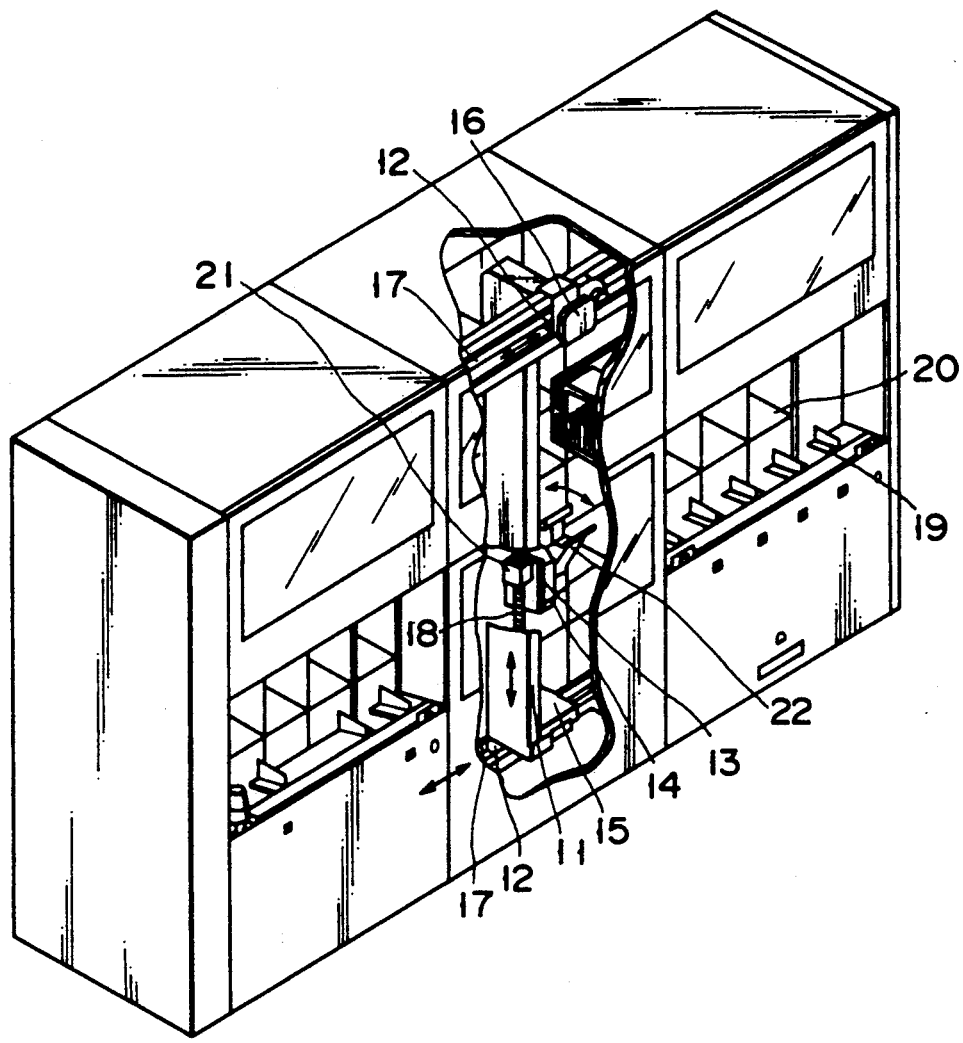
F I G. 2

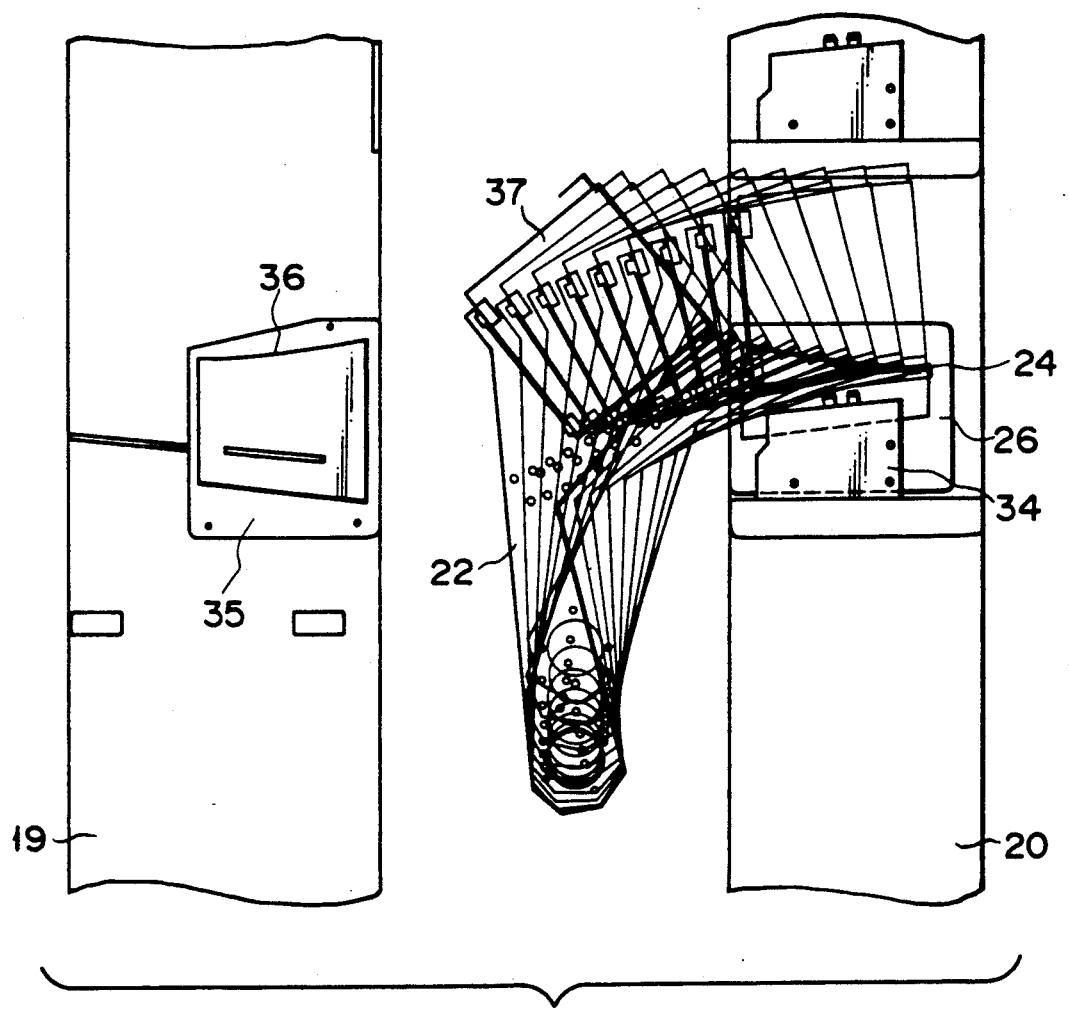
F I G. 6

HANDLING APPARATUS

This application is a continuation of application Ser. No. 07/320,223 filed on Mar. 7, 1989, now abandoned.

BACKGROUND OF THE INVENTION

1. Field of the Invention

The present invention relates to a handling apparatus for lifting, moving, mounting, etc., an object in a two-dimensional region, and, in particular, to a safety mechanism for such an apparatus.

2. Description of the Related Art

In a handling apparatus having two degrees of freedom, there is a case wherein the movement of a holding member for holding an object need be controlled so that the holding member can move along a predetermined locus. For example, there is a handling apparatus wherein a hand arm is attached, via rotational moving means, to an elevation mechanism movable along vertical moving means, and a carrier holding member for holding a wafer carrier containing a plurality of semiconductor wafers is attached to an end portion of this hand arm. In the case where the wafer is moved between a loading/unloading table and a stock section within a clean stocker by using this handling apparatus, it is necessary, in order to reduce to a minimum the space where the wafer carrier is moved, to synchronize the movement of the vertical moving means and that of the rotational moving means and vertically move and rotate the carrier holding member, thereby to move the wafer carrier in the horizontal direction.

In general, as means for satisfying this demand, a control system is employed wherein an increment from the initial positions of vertical moving means and rotational moving means is detected by encoders provided on both moving means and the synchronous movement of the vertical moving means and rotational moving means is controlled based on the detected increment.

However, in this type of conventional handling apparatus, since the synchronous movement of the vertical moving means and rotational moving means is controlled by the encoders, it is highly possible that, when the movement of the carrier holding member deviates from a predetermined locus owing to an abnormality of the hardware or software, the handling apparatus may contact or collide other peripheral devices.

In addition, in this conventional apparatus, the moving means are controlled based on the increment from the initial positions thereof. Thus, when it becomes impossible to identify the current positions of the moving means, for example, because the apparatus is stopped in the course of operation, the operation of the apparatus becomes impossible thereafter.

SUMMARY OF THE INVENTION

The object of the present invention is to provide a handling apparatus which can immediately stop the movement of a handling mechanism when the movement of the handling mechanism deviates from a predetermined locus, thereby to ensure the normal operation of the handling mechanism thereafter.

According to the present invention, there is provided a handling apparatus comprising holding means for holding an object to be handled, driving means for driving the holding means, a locus detection section provided in a fixed position which is not driven by the driving means, said locus detection section representing a locus along which the holding means is to move, and sensing means, provided on the holding means, for detecting the locus.

In the handling apparatus of the present invention, the locus detection section may be a reflection plate having a light reflection region. The outline of the light reflection region may serve a locus detection line representative of the locus. An optical sensor may be used as the sensor. The optical sensor may comprise a light emitting element and a light receiving element.

The locus detection section may be a reflection plate having a light reflection region and a light non-reflection region. In this case, a boundary line between the light reflection region and the light nonreflection region may be a locus detection line representative of said locus.

Furthermore, the reflection plate may have a notch serving as the light non-reflection region. In this case, the outline of the notch may be the locus detection line.

The optical sensor may comprise three reflectiontype optical sensors. The locus detection line is located between two of the three optical sensors so that the locus of the holding means can be detected.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 2 is a partially cutout perspective view showing a clean stocker containing a wafer carrier, in which a handling apparatus according to one embodiment of the present invention is incorporated;

FIG. 6 shows a locus of a carrier holding member of the handling apparatus shown in FIG. 3.

DESCRIPTION OF THE PREFERRED EMBODIMENTS

Figure 1:
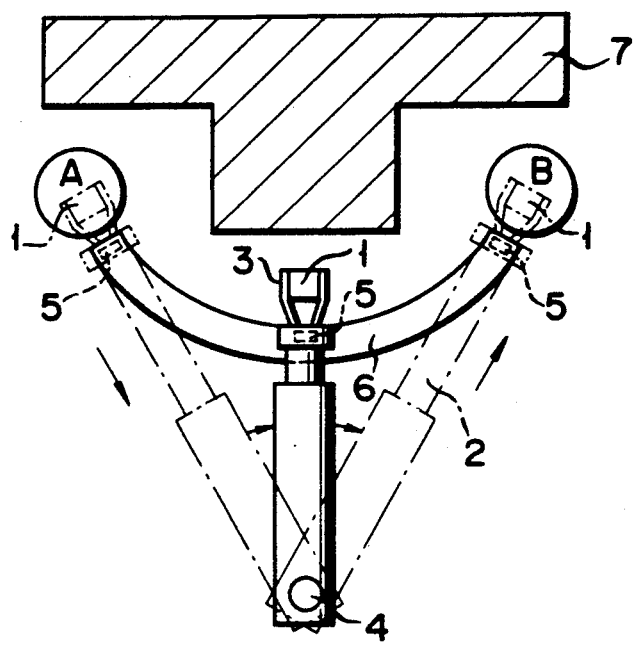
FIG. 1 is a view for explaining a general principle of the operation of the handling apparatus according to the present invention.

FIG. 1 is a plan view for explaining a general principle of the operation of the handling apparatus according to the present invention.

In FIG. 1, object 1 is moved from position A to position B by hand arm 2. At first, holding member 3, attached to an end portion of hand arm 2 holds object 1 on a table at position A. After object 1 is slightly lifted, hand arm 2 is rotated about rotational shaft 4 while it is shortened and then lengthen. When object 1 has reached position B, the rotation and lengthening of hand arm 2 are stopped. And then, object 1 is lowered and placed on a table at position B. In this case, hand arm 2 must follow a predetermined locus. However, if hand arm 2 deviates from the locus, hand arm 2 and object 1 and holding member 3 may contact other member 7, or object 1 may be carried to a position different from position B. In order to prevent such a situation from occurring, optical sensor 5 is provided at a predetermined location of hand arm 2, and reflection plate 6 is arranged in a fixed position corresponding to a locus of optical sensor 5 which is produced when hand arm 2 is moved. More specifically, the position of hand arm 2 is constantly detected by optical sensor 5 during the movement of hand arm 2, and, if hand arm 2 deviates the locus, the position of optical sensor 5 deviates from the position of reflection plate 6. In this case, optical sensor 5 cannot detect a reflection light beam produced from a light-emitting element, and the movement of hand arm 2 is immediately stopped. After the movement of hand arm 2 is stopped, hand arm 2 is restored to a position where the beam reflected by reflection plate 6 can be detected by optical sensor 5, and, while the position of hand arm 2 is detected by optical sensor 5, hand arm 2 is operated.

The handling apparatus of the present invention is operated based on the above basic principle.

The apparatus of the present invention is characterized in that a locus detection section is arranged in a fixed position which is not driven by a driving system, and the apparatus is operated while a light beam reflected by the locus detection section is constantly monitored by an optical sensor. In this invention, when the handling apparatus of the present invention is operated, holding means for holding an object to be handled is moved in a predetermined region, and the sensor moves along the locus detection section in accordance with the movement of the holding means. In this state, it is confirmed that the driving system functions normally. If the sensor deviates from the locus detection section, the driving system is immediately stopped. Then, the holding means is moved to a position where the locus detection section can be detected by the sensor, and the holding means is restored to an initial position.

FIG. 2 is a partially cutout perspective view showing a clean stocker containing a wafer carrier, in which the handling apparatus according to an embodiment of the invention is incorporated.

Ball screw 18 is arranged within vertical axis frame 11 and is rotated by vertical driving mechanism 15. Nut 21 is attached to ball screw 18. Rotating driving mechanism 14 is attached to base 13 fixed on nut 21.

Caster 12, which is arranged between upper and lower guides 17, is attached to an end portion of vertical axis frame 11. Horizontal axis driving mechanism 16 is attached to caster 12. Guides 17 and caster 12 are connected by a rack-and-pinion mechanism. Torque is transmitted from horizontal driving mechanism 16 to caster 12, so that vertical axis frame 11 is horizontally moved.

By the operation of above-described rotating driving mechanism 14, vertical driving mechanism 15 and horizontal driving mechanism 16, wafer carriers placed on loading/unloading table 19 are sequentially stored in stock section 20.

Figure 3:
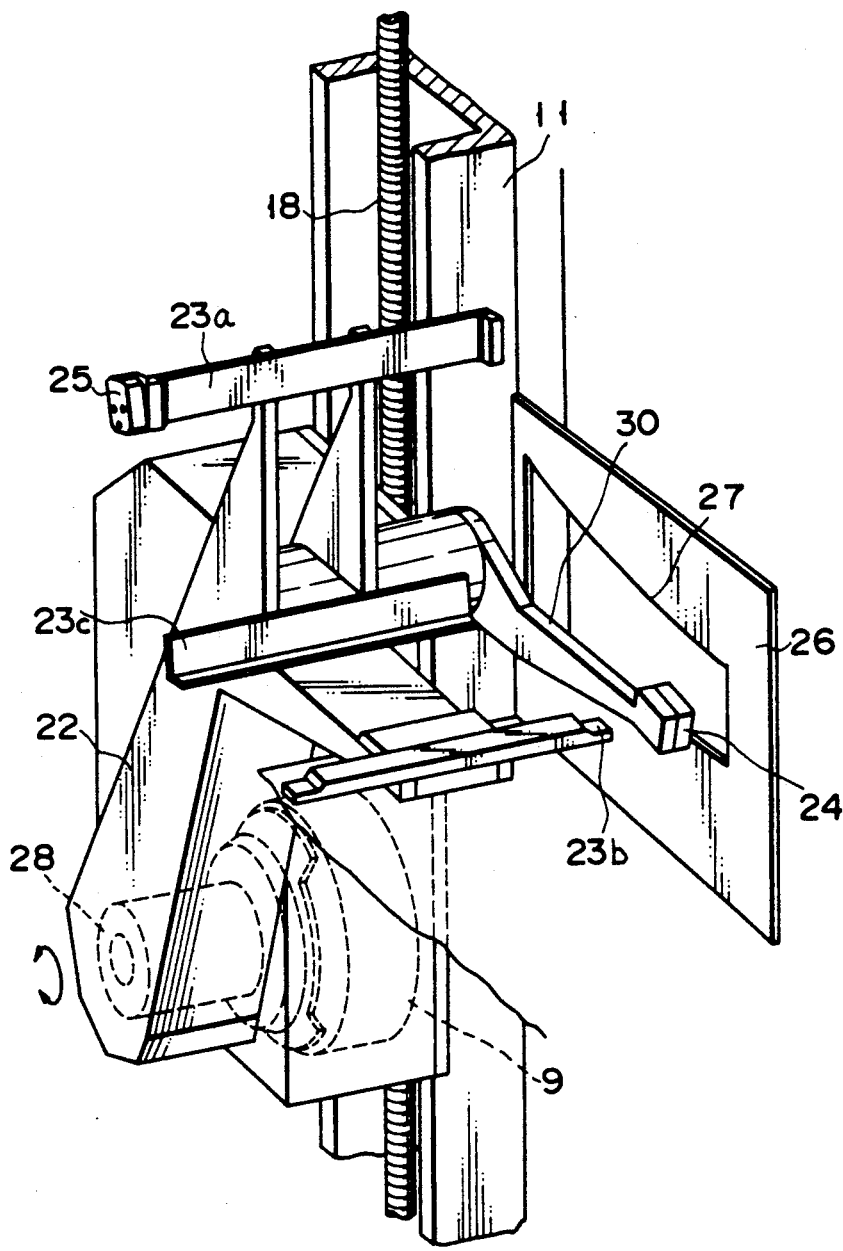
FIG. 3 is a perspective view showing a part of the handling apparatus shown in FIG. 2.

FIG. 3 is a perspective view of an enlarged portion of the handling apparatus shown in FIG. 2.

An output from a motor (not shown) is transmitted to rotation output axis 28 through a reduction device such as a Harmonic Drive (trademark). Hand arm 22 is secured on rotation output axis 28, and three carrier holding members 23a, 23b and 23c for holding a wafer carrier are attached on an end portion of hand arm 22. An end portion of one carrier holding member 23a is provided with locus detecting sensor 25 for confirming the locus on the side of loading/unloading table 19. Also, hand arm 22 is provided with sensor arm 30. An end portion of sensor arm 30 has locus detecting sensor 24 for confirming the locus of the stock section side.

Reflection plate 26 is attached to a fixed member, for example, stock section 20, which is separate from the driving system, such that reflection plate 26 faces sensor arm 30. Reflection plate 26 has a notch. The line defining the notch serves as locus detection line 27 along which sensor 24 moves.

Figure 4:
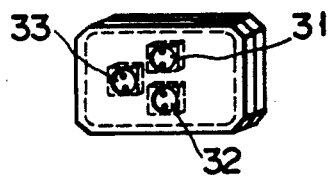
FIG. 4 shows a locus detecting sensor attached to the apparatus of FIG. 3.

FIG. 4 shows locus detecting sensor 24, 25, which is provided with three reflection-type optical sensors 31, 32 and 33.

Figure 5:
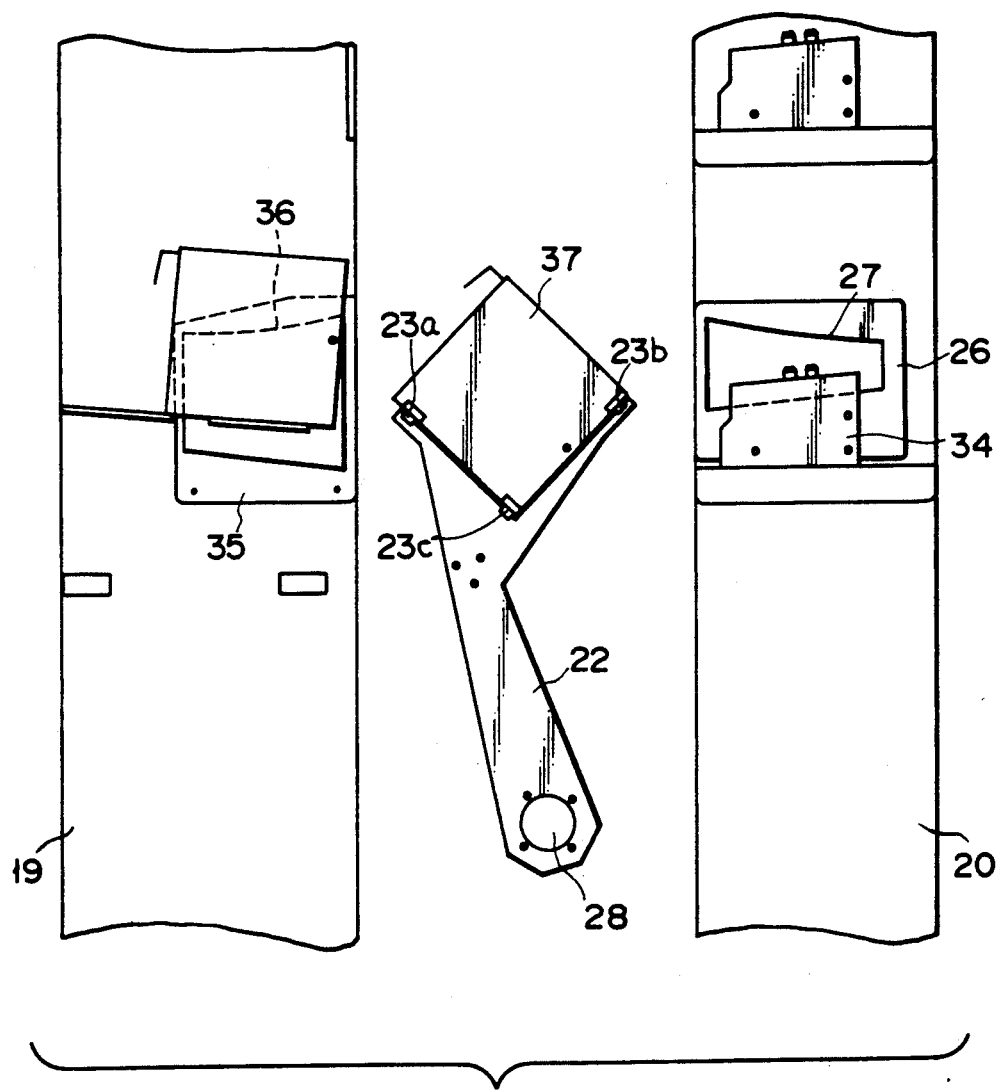
FIG. 5 shows a mode in which a wafer carrier is handled by the handling apparatus of FIG. 3.

FIG. 5 shows the state wherein the wafer carrier is handled.

In stock section 20, a plurality of stands 34 are vertically arranged for mounting wafer carriers thereon. As stated above, stock section 20 is provided with reflection plate 26. Similarly, on the side of loading/unloading table 19, reflection plate 35 is arranged so as to face sensor 25 shown in FIG. 4. A notch is made in reflection plate 35. The line defining the notch serves as locus detection line 36 along which sensor 25 moves.

Wafer carrier 37 can be freely transferred between and stock section 20, by the vertical movement of hand arm 22 along the vertical shaft, and the rotation of hand arm 22 about rotation shaft 28 synchornized with the vertical movement.

FIG. 6 shows a locus of the movement of hand arm 22 and wafer carrier 37, while wafer carrier 37 is mounted on stand 34 within stock section 20. Since the space over stand 34 is small, it is necessary to move wafer carrier 37 horizontally and linearly so that wafer carrier 37 does not touch the bottom of another upper stand. In addition, after wafer carrier 37 is mounted on stand 34, it is necessary to pull the carrier holding portion of hand arm 22 horizontally and linearly. In this case, it is necessary to move the central part of locus detecting sensor 24 along locus detection line 27 with defines the notch of reflection plate 26. For this purpose, the vertical moving means along which hand arm 22 moves vertically and the rotational moving means about which hand arm rotates must be synchronously driven. To achieve this synchronous operation, encoders are provided on the vertical moving means and the rotational moving means in order to detect an increment of the movement of each moving means from its initial position, and the synchronous movement of the vertical moving means and rotational moving means is controlled based on the detected increment.

Figure 7A:
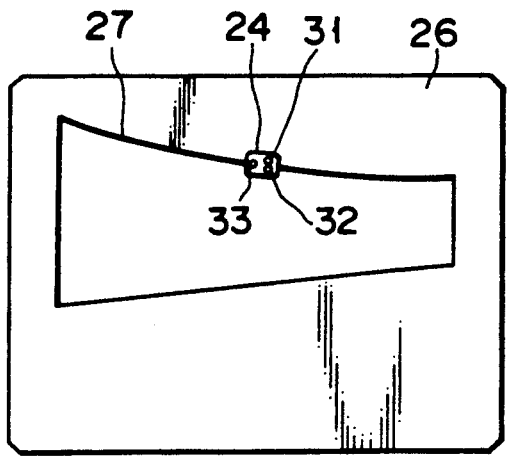
FIGS. 7A and FIG. 7B show positional relationships between the locus detecting sensor of the handling apparatus of FIG. 3 and a reflection plate.
Figure 7B:
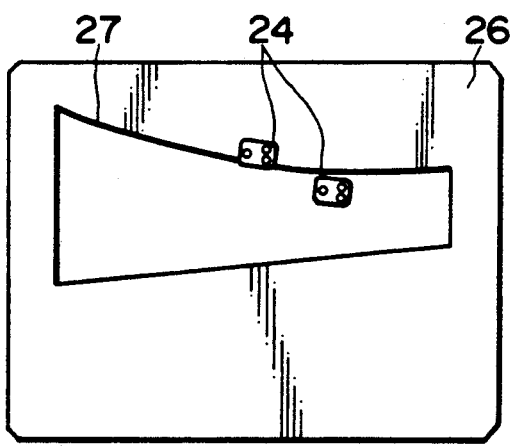

FIGS. 7A and 7B show the positional relationships between locus detecting sensor 24 and reflection plate 26 while the vertical moving means and rotational moving means are synchronously driven. FIG. 7A shows the case wherein hand arm 32 normally functions, and FIG. 7B shows the case wherein hand arm 22 malfunctions. More specifically, in FIG. 7A, locus detection line 27 is located between reflection-type optical sensors 31 and 32. On the other hand, in FIG. 7B, both reflection-type optical sensors 31 and 32 are located on the side of reflection plate 26 or on the side of the notch, and locus detection line 27 is not located between optical sensors 31 and 32. In this case, locus detection line 27 is constantly detected by reflection-type optical sensors 31, 32 and 33, and, when locus detecting sensors 24 deviates from locus detection line 27 for some reason, the driving of the vertical and rotational moving means is immediately stopped for safety purpose.

The driving of each moving means is controlled based on the detected increment of the movement of each moving means from its initial position. Thus, when the detection of the current position of each moving means becomes impossible because of the sudden stop of the driving of the moving means, hand arm 22 is pulled from stock section 20 as follows. Namely, the current positions of the moving means are detected by locus detecting sensor 24, and the position of sensor 24 is restored to a point corresponding to locus detection line 27 of reflection plate 26 so that hand arm 22 does not touch other members within stock section 20. Then, while locus detection line 27 is detected by locus detecting sensor 24, hand arm 22 is pulled from stock section 20, and is initialized. Since the reflection plate having locus detection line 27 and the sensor for detecting locus detection line 27 are separated from the driving system, the safety in the operation of the hand arm can be ensured, and the hand arm can be smoothly pulled from the stock section even if it strays from the normal path.

The above description was directed to the embodiment wherein the reflection plate having the notch was used. However, the present invention is not limited to this embodiment, and any type of reflection plate can be used if the position of the hand arm can be confirmed by using a reflection light beam. For example, a reflection plate of a given shape, which is not provided with a notch, may be used. Also, a reflection plate having two regions whose reflectances are different may be used.

In the above description, the optical sensor was used. However, an ultrasonic wave sensor or the like may be used.

As stated above, according to the handling apparatus of the present invention, when the holding means deviates from a predetermined locus, the abnormality of the holding means can be detected by the locus detection section provided in a fixed position which is not driven by the driving means, and by the sensor provided on the holding means. Once the abnormality of the holding means is detected, the driving means is suddenly stopped. Thus, the holding means can be prevented from contacting other members, and safety in the operation of the handling apparatus can be ensured. After the sudden stop of the driving means, the holding means is restored to a normal position so that the holding means can be moved along a predetermined locus. Therefore, even if an abnormality occurs in the holding means, a series of operations thereafter can be performed safely and surely while the position of the holding means is being detected by the sensor.

What is claimed is:

1. A handling apparatus comprising:
   holding means for holding an object to be handled;
   driving means for driving said holding means;
   locus indicating means for indicating a locus along which said holding means is to be moved, said locus indicating means being provided in a fixed position which is not driven by the driving means;
   sensing means for monitoring movement of said holding means along said locus and detecting deviation of the movement of the holding means from said locus, said sensing means being provided on said holding means; and
   stopping means for stopping movement of said holding means when the deviation of movement of said holding means is detected wherein said sensing means comprises at least three reflection-type optical sensors, and said locus detection line is located between two of the at least three optical sensors so that the locus of the holding means can be detected.

2. The handling apparatus according to claim 1, wherein said locus indicating means comprises a reflection plate having a light reflection region, the outline of said light reflection region serves a locus detection line representative of said locus, and said sensing means comprises a light emitting element and a light receiving element.

3. The handling apparatus according to claim 1, wherein said locus indicating means comprises a reflection plate having a light reflection region and a light nonreflection region, a boundary line between the light reflection region and the light non-reflection region is a locus detection line representative of said locus, and said sensing means comprises a light emitting element and a light receiving element.

4. The handling apparatus according to claim 3, wherein said reflection plate has a notch serving as said light non-reflection region, and the outline of the notch is said locus detection line.

5. The apparatus according to claim 1, wherein said driving means comprises vertical moving means for vertically moving said holding means and rotational moving means for rotating said holding means.

6. The handling apparatus according to claim 1, which comprises means for returning said holding means to a position to be detected by said sensing means after said holding means is stopped.

* * * * *